United States Patent [19]

Gardner

[11] Patent Number: 5,517,530
[45] Date of Patent: May 14, 1996

[54] METHOD AND APPARATUS FOR DUAL DEMODULATION OF MOBILE CHANNEL SIGNALS

[75] Inventor: Steven H. Gardner, San Diego, Calif.

[73] Assignee: Pacific Communication Sciences, Inc., San Diego, Calif.

[21] Appl. No.: 494,712

[22] Filed: Jun. 26, 1995

Related U.S. Application Data

[63] Continuation of Ser. No. 150,616, Nov. 9, 1993, abandoned.

[51] Int. Cl.$^6$ .................................................. H04L 27/22
[52] U.S. Cl. ........................................... 375/325; 375/346
[58] Field of Search .................................. 375/324, 325, 375/328, 340, 346, 349; 455/132, 133, 134, 135, 277.2, 277.1

[56] References Cited

U.S. PATENT DOCUMENTS

| 4,290,140 | 9/1981 | Malm | 375/82 |
|---|---|---|---|
| 5,283,531 | 2/1994 | Serizawa et al. | 375/14 |

FOREIGN PATENT DOCUMENTS 0390351  10/1990  European Pat. Off. .

OTHER PUBLICATIONS

*A Parallel Systems Approach to Universal Receivers*, Madhow et al., IEEE Transactions on Information Theory, vol. 27, No. 2, Mar. 1991, pp. 291–306.

*Parallel Structures for Universal Communication Receivers*, Communication, Control, And Signal Processing, Proceedings of the 1990 Bilkent International Conference on New Trends in Communication, Control, and Signal Processing held at Bilkent Univ., Ankara, Turkey, vol. 1, 2–5 Jul. 1990, pp. 215–227.

*Universal Receivers with Side Information From the Demodulators: An Example for Nonselective Rician Fading Channels*, Madhow et al., IEEE Transactions on Communications, vol. 42, No. 7, Jul. 1994, pp. 2395–2405.

*Primary Examiner*—Stephen Chin
*Assistant Examiner*—Hai H. Phan
*Attorney, Agent, or Firm*—Blakely, Sokoloff, Taylor & Zafman

[57] ABSTRACT

Selectable demodulation means within a given receiver to demodulate signals potentially subjected to many different types of degradations as typically encountered in mobile communications systems, and to select the best result of provide significant performance improvement is disclosed. In accordance with the method, when an RF signal is received it is sampled and the samples are demodulated. Demodulation is performed using both coherent and non-coherent schemes with the preferred scheme selected according to the quality of performance of each demodulator. Coherent demodulation can provide better performance when the signal is subjected to significant path loss but little fading. Non-coherent demodulation can provide better performance when the signal is subjected to less path loss but significant fading. Details of the method are disclosed.

13 Claims, 3 Drawing Sheets

METHOD AND APPARATUS FOR DUAL DEMODULATION OF MOBILE CHANNEL SIGNALS

This is a continuation of application Ser. No. 08/150,616 filed Nov. 9, 1993 which is now abandoned.

FIELD OF THE INVENTION

This invention relates to the field of mobile digital communications, and more particularly, cellular communications.

BACKGROUND OF THE INVENTION/PRIOR ART

In the area of mobile data communication systems, the design of the receiver is a crucial factor in the determination of the performance of such systems. Input to the receiver is an RF signal from the antenna as depicted in FIG. 1. The output of the receiver is the data which ideally is the same as the transmitted data.

Mobile radio systems are expected to operate in a variety of environments. It is therefore conceivable that a mobile radio will operate in a static environment in which the primary impairment is the effect of receiver front end noise, which may be large relative to the signal if the radio is used within a building and subject to path loss through the walls of the building. Other mobile radios operating on the same system may be operating in a mobile environment in which the primary sources of degradation are fading and multipath. The best receiver technique for the static environment is not necessarily the best for the mobile environment.

Data sent by such transmitters is often carried by the phase of the carrier signal, especially in commonly used modulation techniques such as BPSK, QPSK, OQPSK, π/4 shifted DQPSK, MSK, tamed-FM, LRC, or GMSK. To recover data correctly, the receiver must therefore accurately detect the phase of the data.

In a stationary environment inside a building, received signals are primarily degraded by additive white Gaussian noise (AWGN) caused by the receiver front end. The signal received by either the base station or the portable unit may be very weak because of path loss resulting from its propagation through the building walls, and as a result, the ratio of signal to noise power (signal-to-noise ratio or SNR) may be quite low. The performance of the receiver is a strong function of the SNR. If the portable unit is stationary, the effects of Rayleigh fading and multipath on the receiver will be relatively minor. It is well known that for such a channel, optimum performance is obtained using a coherent demodulation technique in which the demodulation uses a frequency source that phase locks to the carrier frequency of the received signal.

However, when the portable unit is moving, and especially when the motion is rapid, the signal is degraded by Rayleigh fading and multipath in addition to AWGN. The Rayleigh fading causes rapid phase changes to the received signal. In these cases, non-coherent demodulation may prove to be superior to using coherent techniques for phase recovery. Non-coherent techniques may include the use of limiter discriminators or differential techniques in which the receiver can make decisions based on phase changes as opposed to the absolute phase of the received signal. It is common practice in the industry to use either one of the two above demodulation techniques for data recovery in receivers for mobile communications. These receivers do not adapt to the different environments in which the radios operate. The problem is then presented to design a receiver that takes into account these sources of degradation which are variable in nature due to the changes in the environment of a mobile radio.

BRIEF SUMMARY OF THE INVENTION

Demodulation methods and apparatus for a receiver demodulating mobile channel messages using multiple techniques of demodulation and selecting the best result to provide significant receiver performance improvement are disclosed. In accordance with the method, the signals of the mobile channel are received and sampled. Data is organized into blocks which are demodulated to recover the best possible estimate of the transmitted data. The blocks of samples are demodulated once using a non-coherent technique where data is recovered by observing changes in the phase of the signal, and each block is evaluated to determine the quality of the demodulation. If the quality is acceptable the next block is received and demodulated similarly to the previous block. However, if the quality of the demodulation is determined to be unacceptable (according to some criterion), demodulation of the same block of samples is performed using coherent techniques where the absolute phase of the signal is used to recover the data. Details and alternate methods are disclosed.

DETAILED DESCRIPTION OF THE PREFERRED EMBODIMENT

Figure 1:
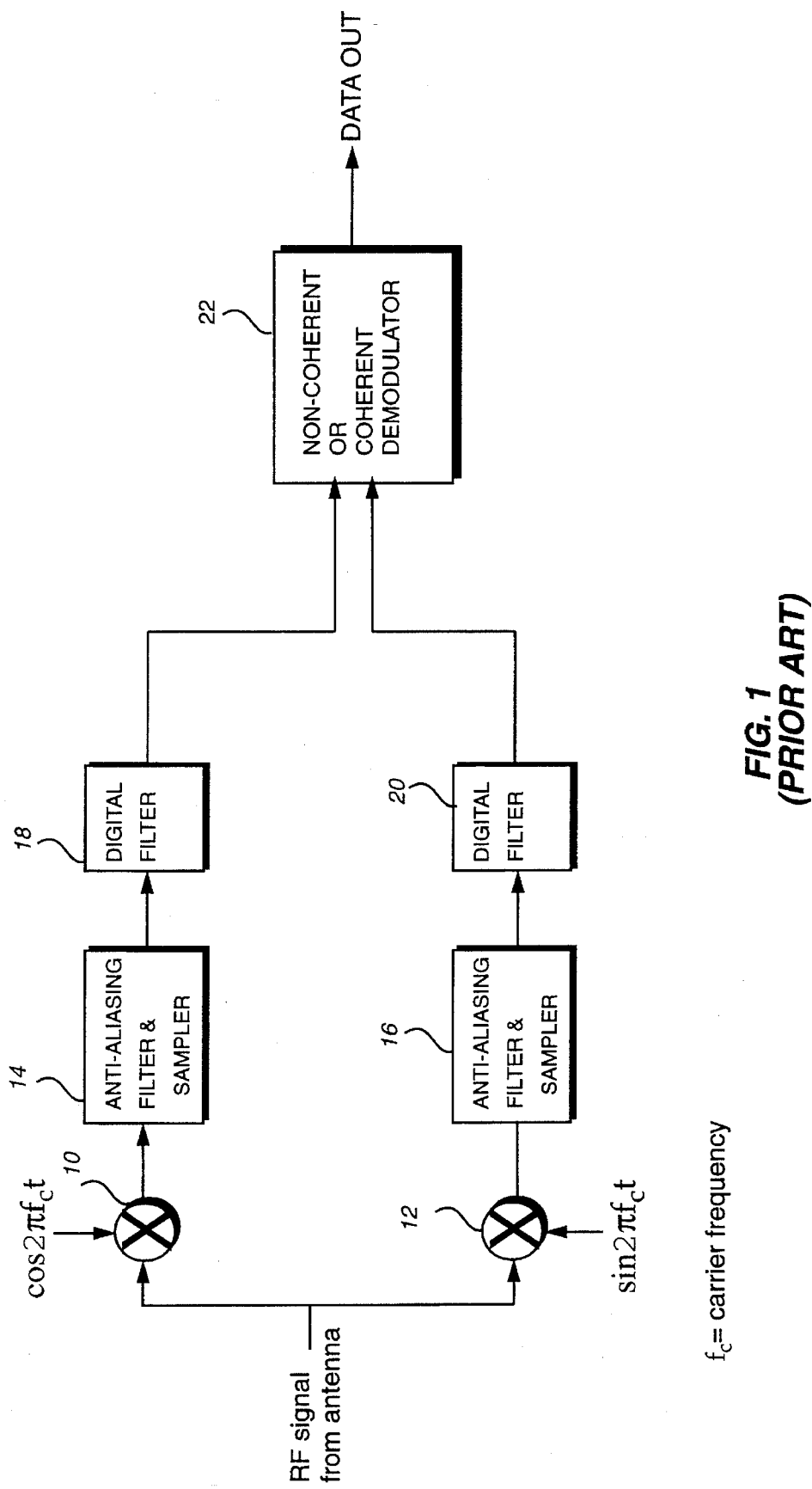
FIG. 1 shows a block diagram of a prior art design of a mobile receiver using a non-coherent demodulation technique.
Figure 2:
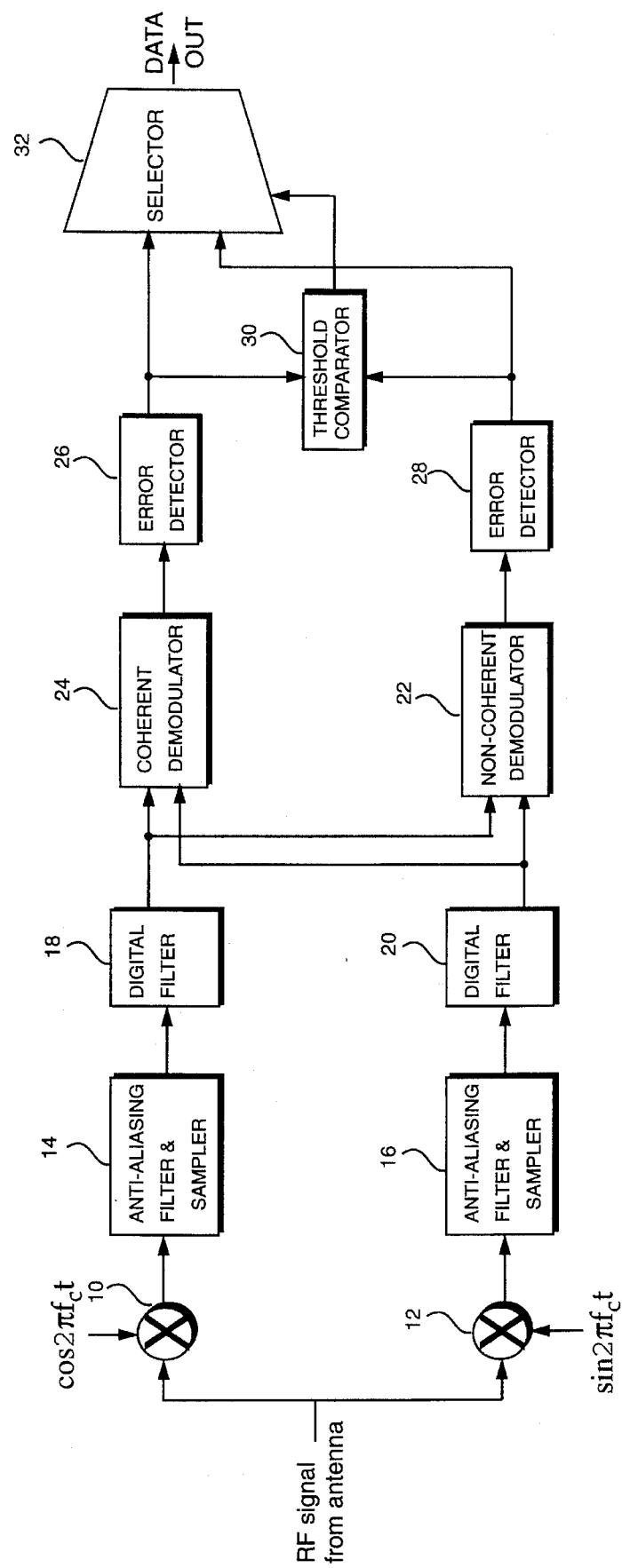
FIG. 2 shows a block diagram of the invention where non-coherent and coherent demodulation are carried out in parallel and used to demodulate mobile channel signals in a receiver.

A block diagram of the receiver portion of a mobile radio communications system incorporating the present invention is shown in FIG. 2.

As is well known in the prior art, recovery of mobile data signals requires demodulation of the incoming sampled signal. Either coherent or non-coherent demodulation can be used for data recovery. Coherent detection requires a reference signal that tracks the phase of the carrier of the received signal. Coherent demodulators multiply the in-coming signal by the in-phase and quadrature components of the local carrier oscillator. The disadvantage of such coherent demodulators is that if the phase of the in-coming signal is constantly fluctuating, it can be very difficult to track, and if the tracking is inadequate, incorrect data decisions will result (refer to "Digital Transmission of Information" pp. 91–97 by Richard E. Blahut.)

A non-coherent demodulator, however, operates on differences in the phase of the in-coming signal. There are many well known ways of implementing non-coherent demodulators, such as limiter-discriminator receivers or differentially-coherent receivers in which the carrier phase is not tracked, but decisions are made based on the phase difference from bit to bit. A disadvantage of this demodulation scheme is that when a given sample is badly corrupted by channel impairments, it can often cause a pair of errors, since it is used in the decision making process for two bits. Thus in the static environment, non-coherent techniques tend to produce significantly more bit errors than coherent techniques and consequently require greater received signal power to achieve a given performance level. Thus in a static environment, coherent receivers can typically outperform non-coherent receivers (refer to "Digital Transmission of Information" pp. 97–100 by Richard E. Blahut for a discussion on non-coherent demodulation.)

Mobile radio signals experience multipath or Rayleigh fading due to the many different propagation paths between the transmitter and the receiver. These fades are accompanied by substantial and rapid signal phase changes. Coherent demodulation techniques often cannot track these phase changes, with the result that the performance of the coherent demodulator may be much worse than the non-coherent demodulator, which does not have to track the phase changes. Thus in a moving environment, if the motion is rapid enough to make tracking the carrier phase difficult, non-coherent demodulation may significantly outperform coherent demodulation.

The performance of a mobile radio receiver is thus greatly improved if the option is provided to select either coherent and non-coherent demodulation schemes depending on the environment. It is the object of this invention to take advantage of the capabilities of both kinds of demodulation by means of a receiver in which the signal is or can be demodulated using both techniques and a means is provided to determine which technique gives the better result or at least a satisfactory result. In most cases, either technique is likely to provide adequate performance, but in marginal static channels only the coherent technique is likely to work, and in marginal channels with rapid motion only the non-coherent technique is likely to work. Thus the performance of the overall receiver is improved by comparison to a receiver that employs only one of the two methods.

Figure 3:
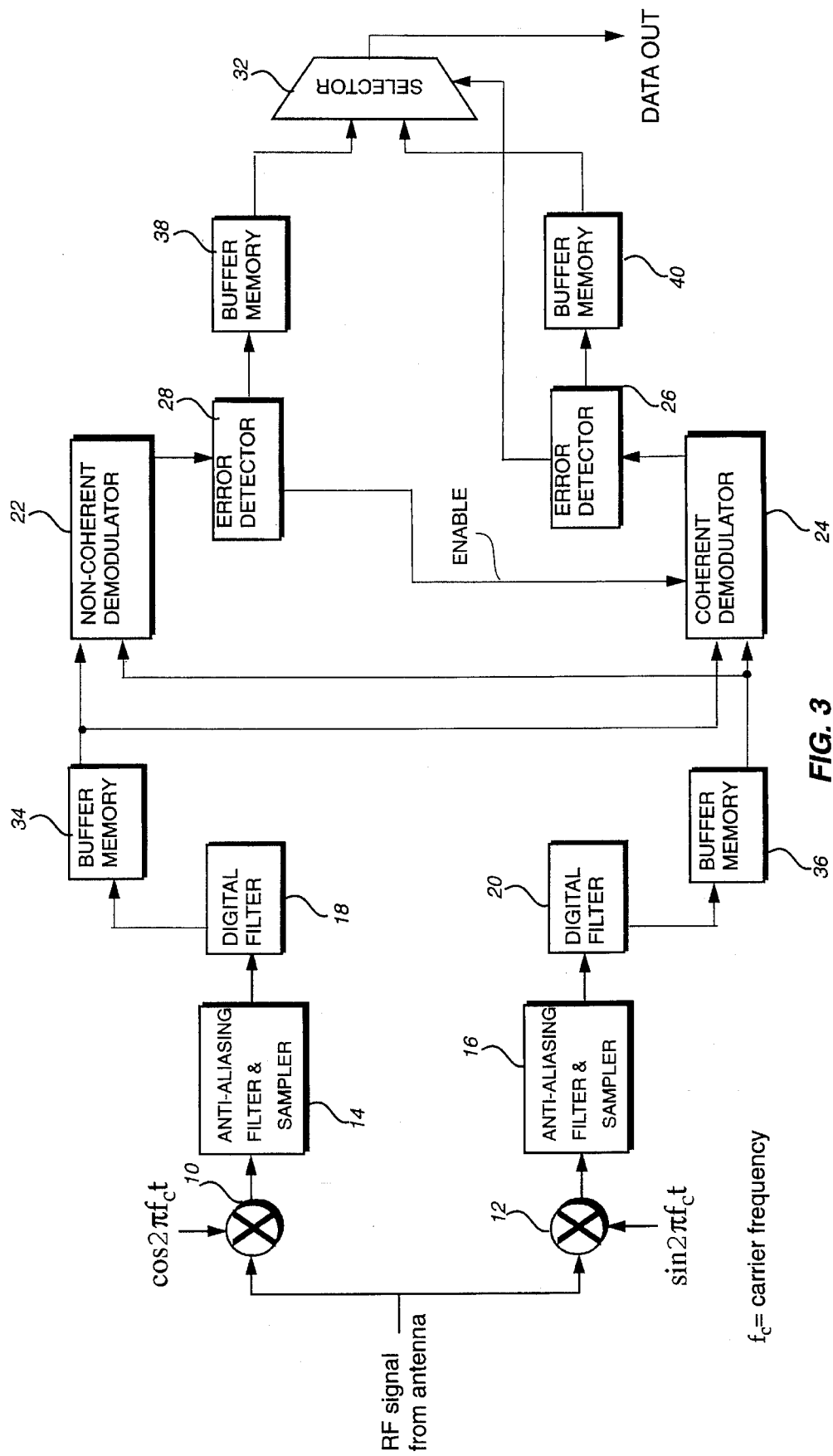
FIG. 3 shows a block diagram of the invention where non-coherent and coherent demodulation are carried out in series and used to demodulate mobile channel signals in a receiver.

Referring to FIG. 2, the RF signal received from the antenna is demodulated pr downshifted using a local carrier oscillator by demodulators (multipliers) 10 and 12 to provide baseband or near baseband in-phase and quadrature components of the signal. These components are then passed through analog antialiasing filters 14 and 16 and are sampled at a rate adequate to prevent aliasing (a sampling rate 4 times the symbol rate is used in the preferred embodiment, but other sampling schemes are possible) and subsequently may be digitally filtered by digital filters 18 and 20. (Note that the RF signal does not have to be converted to baseband prior to sampling i.e., the signal can be sampled at RF while containing the carrier frequency and then demodulated using a digital signal processor. The invention disclosed herein is independent of the method of conversion chosen.) In the preferred embodiment of the invention, the output of the digital filters is stored in buffers 34 and 36 that hold a full block of samples as shown in FIG. 3. The samples are held until at least one demodulator successfully demodulates the data or the system determines that neither demodulator can successfully demodulate the signal.

In this embodiment, data blocks are encoded with a forward error correcting code (such coding schemes are discussed in textbooks such as "Error-Correction Coding for Digital Communication" by George C. Clark, Jr. and J. Bill Cain pp. 247–260). When the samples are available, the demodulator 22 attempts to demodulate the block of samples using non-coherent demodulation, and an error decoder and corrector 28 detects the presence of errors in the demodulated signal, corrects as many errors as possible and will detect whether uncorrectable errors remain in the output. Thus, the quality of the signal may be measured by the number of remaining uncorrectable errors, i.e. if there are no uncorrectable errors remaining after error correction has been performed, the quality of the signal is satisfactory and the demodulation is considered successful. Where the demodulation is successful, the data is output from buffer memory 38 through selector 32 and the demodulator proceeds to the next block of samples.

If there are uncorrectable errors in the block such that the quality of the received signal is poor, the demodulator 24 then tries to demodulate the same block of samples using the coherent technique. The decoder again corrects errors and determines the quality of the signal. If there are no uncorrectable errors, the demodulation is successful and the data is output from buffer memory 40 through selector 32, while the demodulation proceeds to the next block. If there are still uncorrectable errors, the demodulator indicates that the quality of the signal is too bad in the block failed to demodulate without uncorrectable errors, normally resulting in a retransmission of the block.

Other embodiments might execute non-coherent and coherent demodulation simultaneously, including simultaneous error correction and detection. Thus the invention disclosed includes the implementation of the two demodulation techniques either in parallel (simultaneous) as shown in FIG. 2 or in serial fashion as seen in FIG. 3. In the latter case, where the demodulators are in series, referring to FIG. 3, the non-coherent demodulator 22 and coherent demodulator 24 receive their input from the same source which is the in-phase and quadrature buffer memories. Yet, the demodulations are actually conducted is series because coherent demodulation is performed only if non-coherent demodulation results in many errors and thus the coherent demodulator 24 is enabled by the error detector block 28. In the embodiment of FIG. 2 wherein the non-coherent and coherent demodulation and error correction and detection channels operate simultaneously, the quality of the demodulated signal may be determined, by way of example, by the first channel to yield a result free of any indicated uncorrectable errors, or by the channel with no indicated uncorrectable errors and the least number of errors needing correction, or any of the foregoing together with some other indicator of quality such as a separate measure of received signal character, or even including a comparison of the two results if both indicated no uncorrectable errors, as differing results from the two channels, neither of which indicate an uncorrectable error, indicates that one (or both) results had so many errors that it was interpreted as a different valid codeword without any indication of which or both are the offending results.

In addition, many other techniques other than forward error detection can be envisioned to determine the quality, e.g. which demodulation technique produced a sequence of data more likely to match the sequence actually transmitted. These include, but are not limited to, variance in the sample timing error metric and variance in the quantized decision sample.

The implementation of the digital portion of this invention (referring to FIG. 2, the digital portion of the invention consists of the blocks following the samplers) can be achieved using microprocessor-based firmware or hardware circuitry. The effectiveness of the present invention especially applies to mobile radio applications and particularly cellular applications due to the highly transient nature of the environment in which mobile radios must frequently operate.

In the previous description, it was indicated that demodulation will begin as soon as a block of samples is available for analysis. Actually, the signal processing may begin as soon as there are adequate samples available to start processing, so that demodulation, or at least aspects thereof, may be accomplished as the samples still being taken.

Thus, while the present invention has been disclosed and described with respect to certain preferred embodiments thereof, it will be understood to those skilled in the art that the present invention may be varied without departing from the spirit and scope of the invention.

I claim:

1. A method of receiving mobile radio signals in a communications system and recovering information comprising the steps of:
   (a) receiving a mobile radio signal having information phase modulated on a radio signal carrier;
   (b) demodulating the phase modulated mobile radio signal using coherent demodulation;
   (c) demodulating the phase modulated mobile radio signal received in step (a) using non-coherent demodulation, both the non-coherent demodulation and the coherent demodulation of step (b) being performed serially;
   (d) measuring the quality of data for each signal demodulated in step (b) and step (c); and
   (e) selecting, as an output, the data produced by the demodulating step providing the better quality signal.

2. The method of receiving mobile radio signals in a communications system and recovering information according to claim 1 wherein said information includes forward error correction coding.

3. The method of claim 1, further comprising the step of storing the mobile radio signal in memory after receiving the mobile radio signal, so that the same radio signal can be demodulated using step (b) or step (c).

4. A method of receiving mobile radio signals in a communications system and recovering information comprising the steps of:
   (a) receiving a mobile radio signal having information phase modulated on a radio signal carrier;
   (b) demodulating the phase modulated mobile radio signal using coherent demodulation;
   (c) demodulating the phase modulated mobile radio signal received in step (a) using non-coherent demodulation, wherein both the non-coherent demodulation and said coherent demodulation of step (b) are preformed in parallel;
   (d) measuring the quality of data for each signal demodulated in step (b) and step (c); and
   (e) selecting, as an output, the data produced by the demodulating step providing the better quality signal.

5. A method of receiving mobile radio signals in a communications system and recovering information comprising the steps of:
   (a) receiving a mobile radio signal having information phase modulated on a radio signal carrier;
   (b) demodulating the phase modulated mobile radio signal using non-coherent demodulation to provide a first demodulated signal;
   (c) determining the quality of said first demodulated signal;
   (d) comparing the quality of said first demodulated signal to a predetermined signal quality;
   (e) outputting said first demodulated signal if said comparing step indicates that the quality of said first demodulation signal is acceptable;
   (f) if said comparing step does not indicate an acceptable result, demodulating the phase modulated mobile radio signal received in step (a) using coherent demodulation to provide a second demodulated signal;
   (g) determining the quality of said second demodulated signal;
   (h) comparing the quality of said second demodulated signal to the quality of said first demodulated signal; and
   (i) selecting as an output the signal with the better quality.

6. The method of receiving mobile radio signals in a communications system and recovering information according to claim 5 wherein said information includes forward error correction coding, and wherein each said demodulation is followed by an error detection and correction using said forward error correction coding prior to providing a measure of quality thereof.

7. The method of claim 5, further comprising the step of storing the mobile radio signal in memory after receiving the mobile radio signal, and wherein the signal demodulated using coherent demodulation in step (f) is the stored radio signal.

8. A method of receiving mobile radio signals in a communications system and recovering information comprising the steps of:
   (a) receiving a mobile radio signal having information phase modulated on a radio signal carrier;
   (b) demodulating the phase modulated mobile radio signal using a first demodulation technique to provide a first demodulated signal;
   (c) obtaining a measure of quality of said first demodulated signal;
   (d) outputting said first demodulated signal if said measure of quality of said first demodulated signal satisfies a predetermined criterion;
   (e) if said measure of quality of said first demodulated signal does not satisfy said predetermined criterion, demodulating the phase modulated mobile radio signal received in step (a) using a second demodulation technique to provide a second demodulated signal, one of said first and second demodulation techniques being a coherent demodulation technique and the other of said first and second demodulation techniques being a non-coherent demodulation technique;
   (f) obtaining a measure of quality of said second demodulated signal; and
   (g) selecting as an output, the demodulated signal with the better signal quality.

9. The method of receiving mobile radio signals in a communications system and recovering information according to claim 8 wherein said information includes error correction coding, and wherein each said demodulation is followed by an error detection and correction using said error correction coding prior to providing a measure of quality thereof.

10. The method of claim 8, further comprising the step or storing the mobile radio signal in memory after receiving the mobile radio signal, and wherein the signal demodulated using the second demodulation technique in step (e) is the stored radio signal.

11. A method of receiving mobile radio signals in a communications system and recovering information, the information including an error detection and correction code, comprising the steps of:
(a) receiving a mobile radio signal having information phase modulated on a radio signal carrier;
(b) demodulating the phase modulated mobile radio signal using coherent demodulation;
(c) demodulating the phase modulated mobile radio signal received in step (a) using non-coherent demodulation, both the non-coherent demodulation and the coherent demodulation of step (b) being performed serially; and
(d) comparing the demodulated signals produced by step (b) and step (c) to determine whether at least one of the demodulated signals has no uncorrectable errors, wherein
  if only one of the demodulated signals has no uncorrectable errors, outputting the one demodulated signal with no uncorrectable errors after correction of all correctable errors, and
  if both of the demodulated signals have no uncorrectable errors, then
    (1) selecting one of the demodulated signal having no uncorrectable errors based on a predetermined criterion, and
    (2) outputting the selected demodulated signal with no uncorrectable errors after correction of all correctable errors.

12. The method of claim 11, further comprising the step of storing the mobile radio signal in memory after receiving the mobile radio signal, so that the same radio signal can be demodulated using step (b) or step (c).

13. A method of receiving mobile radio signals in a communications system and recovering information comprising the steps of:
(a) receiving a mobile radio signal having information phase modulated on a radio signal carrier;
(b) demodulating the phase modulated mobile radio signal using coherent demodulation;
(c) demodulating the phase modulated mobile radio signal received in step (a) using non-coherent demodulation, wherein both the non-coherent demodulation and coherent demodulation of step (b) are performed in parallel;
(d) comparing the demodulated signals obtained from step (b) and step (c) to determine whether at least one of the demodulated signals has no uncorrectable errors, wherein
  if only one of the demodulated signals has no uncorrectable errors, outputting the one demodulated signal with no uncorrectable errors after correction of all correctable errors, and
  if both of the demodulated signals have no uncorrectable errors, then
    (1) selecting one of the demodulated signal having no uncorrectable errors based on a predetermined criterion, and
    (2) outputting the selected demodulated signal with no uncorrectable errors after correction of all correctable errors.

* * * * *

UNITED STATES PATENT AND TRADEMARK OFFICE
CERTIFICATE OF CORRECTION

PATENT NO. : 5,517,530
DATED : May 14, 1996
INVENTOR(S) : Steven H. Gardner

It is certified that error appears in the above-identified patent and that said Letters Patent is hereby corrected as shown below:

In column 6 at line 61, please delete " or " and insert -- of --.

Signed and Sealed this

Thirty-first Day of December, 1996

Attest:

BRUCE LEHMAN

Attesting Officer  Commissioner of Patents and Trademarks